United States Patent [19]

Weissmann et al.

[11] Patent Number: 5,242,725
[45] Date of Patent: Sep. 7, 1993

[54] MULTILAYER FLEXIBLE MARKING BAND OR TAPE

[75] Inventors: Karl-Heinz Weissmann, Hanover; Lothar Titze, Uetze, both of Fed. Rep. of Germany

[73] Assignee: Pelikan AG, Hanover, Fed. Rep. of Germany

[21] Appl. No.: 557,214

[22] Filed: Jul. 23, 1990

[30] Foreign Application Priority Data

Jul. 28, 1989 [DE] Fed. Rep. of Germany ....... 3925130

[51] Int. Cl.⁵ .............................................. A61F 13/02
[52] U.S. Cl. ........................................ 428/40; 428/214; 428/216; 428/220; 428/323; 428/354; 428/402; 428/407; 428/690; 428/906; 428/914; 156/230; 156/239
[58] Field of Search .................. 428/40, 354, 906, 914, 428/214, 216, 220, 402, 407, 690, 323; 116/DIG. 14, 240, 278; 156/230, 239

[56] References Cited

U.S. PATENT DOCUMENTS

| | | | |
|---|---|---|---|
| 2,256,108 | 9/1941 | Blake | 156/239 |
| 2,387,512 | 10/1945 | Hilberg | 250/484.1 |
| 3,519,456 | 7/1970 | Reed | 428/914 |
| 4,061,516 | 12/1977 | George | 156/230 |
| 4,759,816 | 7/1988 | Kasper | 428/40 |
| 4,875,961 | 10/1989 | Oike | 428/214 |
| 4,880,678 | 11/1989 | Goffi | 428/40 |
| 4,891,260 | 1/1990 | Kunkel | 428/220 |
| 4,923,726 | 5/1990 | Maruyama | 428/40 |
| 4,950,537 | 8/1990 | Vesley | 428/354 |

FOREIGN PATENT DOCUMENTS

| | | | |
|---|---|---|---|
| 0273997 | 7/1988 | European Pat. Off. | |
| 0277426 | 8/1988 | European Pat. Off. | |
| 3741022 | 6/1989 | Fed. Rep. of Germany . | |
| 136386 | 10/1981 | Japan | 156/239 |
| 136438 | 8/1983 | Japan | 428/40 |
| 1095478 | 12/1967 | United Kingdom . | |

OTHER PUBLICATIONS

CPI Basic Abstracts–Journal 1975.
CPI Basic Abstract Journal 1975-Paper No. 63 220 W/38.

Primary Examiner—Ellis P. Robinson
Assistant Examiner—Nasser Ahmad
Attorney, Agent, or Firm—Herbert Dubno

[57] ABSTRACT

A multilayer flexible marking tape for use in highlighting text or applying colored markings to a paper substrate in which a relatively thin cover layer is applied to a carrier which can be stripped from the cover layer and a relatively thick pressure contact adhesive is applied to the cover layer to adhere to the substrate. The adhesive layer contains a coloring agent, preferably a fluorescent pigment.

17 Claims, 1 Drawing Sheet

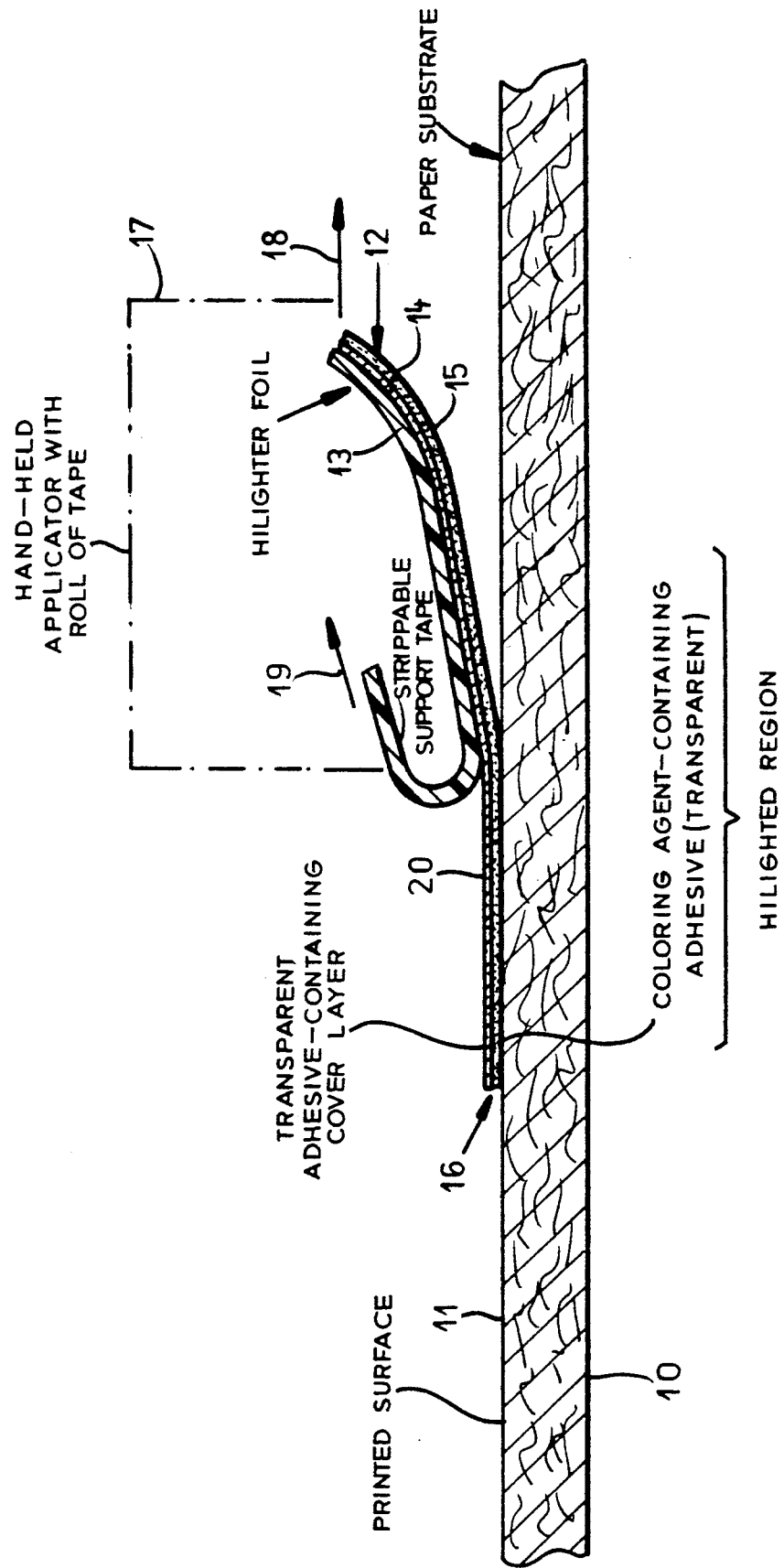

MULTILAYER FLEXIBLE MARKING BAND OR TAPE

CROSS REFERENCE TO CORRESPONDING APPLICATIONS AND PATENTS

This application is related to the following prior commonly owned patents and copending applications:

| Serial No. | Filing Date | Serial No. | Filing Date |
|---|---|---|---|
| 07/392,786 | 11 Aug. 1989 (Abnd) | 07/431,610 | 3 Nov. 1989 (5,006,184) |
| 07/431,608 | 3 Nov. 1989 (abnd) | 07/491,738 | 12 Mar. 1990 (5,125,589) |
| 07/370,246 | 22 Jun. 1989 (U.S. Pat. No. 4,997,512) | 07/274,070 | 18 Nov. 1988 (abnd) |

| U.S. Pat. Nos. |
|---|
| 4,849,064 |
| 4,853,074 |
| 4,891,260. |

FIELD OF THE SUMMARY

My present invention relates to a multilayer flexible marking band or tape and, more particularly, to a marking band or tape which can be utilized for the highlighting of text or for otherwise applying a colored marking strip to a substrate, e.g. a sheet of paper.

BACKGROUND OF THE INVENTION

The term "highlighting" is used to refer to the marking of sections in text books, documents and the like with a transparent colored strip to call attention to the marked regions. In the European Patent Document EP-A-87 102 047.5, for example, it is disclosed that a fluorescent adhesive tape or strip can be applied to a book or document for highlighting purposes. The known fluorescent adhesive tape has the advantage that the marking can be later removed rom the text by drawing off the carrier with which the adhesive layer is associated.

The marking strip which is applied to a particular passage of the text can comprise, in addition to the pressure-activated adhesive layer, a carrier layer and a colored fluorescent cover layer on the carrier layer. So that the text portions covered by the strip remain visible, this entire system must be transparent.

In an alternative configuration, this European patent application describes a configuration in which the sequence of the layers is altered. In this case, the fluorescent cover layer is found between the adhesive layer and the carrier. The carrier is required for the later removal of the marking strip from the text. This three-layer marking strip has fabrication and cost drawbacks. One of the most significant drawbacks is that the strip which is applied to the substrate does not readily tear by simple application of tension to the strip but requires a cutting operating at the end of the strip to be applied.

OBJECTS OF THE INVENTION

It is the principal object of the present invention to provide a multilayer flexible marking strip or tape which does not require the application of a three-layer structure to the substrate and thus can be more economically fabricated and used.

Another object of the invention is to provide a marking strip or tape for the aforedescribed purposes which readily separates to define the end of an applied strip without the need for a cutting operation.

SUMMARY OF THE INVENTION

These objects and others which will become apparent hereinafter are attained, in accordance with the invention in a multilayer flexible marking tape which comprises a carrier, an adhesive layer on the carrier and between the carrier and the adhesive layer, a binder-containing cover layer which has greater adhesion to the adhesive layer than to the carrier, thereby enabling the carrier to be stripped from the cover layer and the adhesive layer as these are applied to the substrate. According to the present invention, the adhesive layer contains a coloring agent.

According to the invention, therefore, the carrier serves as a support for the cover layer and the adhesive layer as they are transferred to the substrate, but is drawn off or stripped from the cover layer once the adhesive layer has been pressed against the substrate and by virtue of the pressure activation of the adhesive layer, bonds the combination of the adhesive layer and cover layer to the substrate.

Since the carrier is stripped away and does not remain in place, only the adhesive layer and the cover layer need be transparent to provide a highlighter type of marking.

The carrier can thus be more freely selected than the carrier of earlier marking tapes. The marking strip of the invention can be applied by a hand-held device of the type described in some of the aforementioned patents, designed to roll the adhesive side of the type against the substrate from a roll of the marking tape within the device and take up the stripped carrier on a take-up roll.

Since the two layer combination of the cover layer and the adhesive layer readily separates when the device is pulled away from the substrate, with the application of tension, there is no need for a separate cutting operation and there is greater precision in application of the marking strip.

The multilayer flexible band for applying a colored marking to a substrate thus can comprise:
  a strippable carrier;
  a binder-containing cover layer adherent to said strippable carrier but from which said carrier can be stripped upon application of said band to said substrate; and
  an application layer containing a coloring agent visible through said cover layer, bonded to said cover layer, and adapted to adhere to said substrate, said cover layer having a stronger adhesion to said adhesive layer than to said carrier.

A method of making a multilayer flexible band of this type can comprise the steps of:
  (a) depositing an aqueous binder dispersion containing a film-forming binder upon a carrier foil, evaporating water from the coating of the dispersion at an elevated temperature, and drying said coating to form said cover layer on said carrier; and
  (b) depositing a coloring-agent-containing and adhesive-containing aqueous dispersion on said cover layer on aid carrier and evaporating water therefrom to dry said coloring-agent-containing and adhesive-containing aqueous dispersion and form said adhesive layer.

The method of applying the colored marking can comprise the steps of:

(a) forming a roll of a multilayer flexible band comprising:
   a strippable carrier,
   a binder-containing cover layer adherent to said strippable carrier but from which said carrier can be stripped upon application of said band to said substrate, and
   an adhesive layer containing a coloring agent visible through said cover layer, bonded to said cover layer and adapted to adhere to said substrate, said cover layer having a stronger adhesion to said adhesive layer than to said carrier;

(b) applying said adhesive layer of said band to said substrate from a hand-held applicator by moving said applicator across said substrate and pressing said applicator thereagainst, to adhere said adhesive layer and said cover layer to said substrate; and (c) simultaneously stripping said carrier from said cover layer, thereby leaving said adhesive and cover layers bonded to said substrate.

The carrier which is stripped from the layers remaining on the substrate which generally is composed of paper, can comprise a plastic foil of the type utilized as a support or carrier in typewriter ribbons. Typical carriers are those composed of polyethyleneterephthalate, polypropylene, polyethylene, polyvinyl chloride or polycarbonate. The carrier can also be a silicone-coated paper in which the silicone coating serves to reduce the adhesion between the cover layer and the carrier. Other anti-adhesion layers can be provided between the carrier and the cover layer, e.g. polytetrafluoroethylene.

The carrier advantageously has a thickness of 10 to 60 micrometers, especially 15 to 55 micrometers, the cover layer preferably a thickness of about 3 to 10 micrometers, especially about 5 to 7 micrometers and the adhesive layer preferably a thickness of about 10 to 30 micrometers, especially about 15 to 25 micrometers.

Best results have been obtained with a thickness ratio of the adhesive layer to the cover layer of about 8:1 to 1:1, especially about 5:1 to 1:1.

It is advantageous when the entire marking tape has a thickness of 10 to 50 micrometers, especially 15 to 30 micrometers.

The adhesive layer can be composed of commercially available adhesive materials and, specifically materials which have elastic and permanent tacky self-adhesive or pressure-adhesive properties with high adhesion force and can bond readily to various surfaces even at light pressure contact and at room temperature. Such adhesives are preferably coated onto the cover layer previously applied to the carrier from aqueous solutions or dispersions in a manner which will not cause redissolution or release of the cover layer.

The adhesives which have fond to be most effective are those which can be termed acrylate-based adhesives. The starting materials can be viscous solutions or dispersions, especially aqueous dispersions of rubber, polyacrylate, polyvinylethers or polyvinylisobutylene. Preferred, as noted, are the polyacrylate-based materials. Suitable commercial products include UCECRYL 913[4] marketed by the firm UCB of Belgium, the plastic dispersion Jagotex KEM 2318 marketed by the firm Jager or the plastic dispersion Acronal V205 marketed by the firm BASF. Especially advantageous has been found to be the commercial product Vantac 295 PEL which is in the form of an anionic aqueous dispersion of a carboxylated acrylic acid copolymer and predominantly comprises butylacrylate with lesser proportions of methylmethacrylate-comonomer. The solids content is 52% by weight, the pH value is 6.0, the density at 20° C. is 500 cP, the molecular weight is about 910,000 (MW) and the mean particle weight is about 270,000 (MN) (i.e. MW and MN being about 910 kg/mol and 270 kg/mol, respectively).

By appropriate selection of the adhesive material, we can use one which allows a later removal of the marking strip by rubbing it off much as rubber cement can be rubbed off a surface coated therewith. This is especially the case with the Vantac adhesive. The adhesive to be used, of course, will depend upon the specific requirements and can be easily determined by the skilled worker in the art without experimentation utilizing simple hand tests.

The adhesive material which is generally provided in an aqueous medium can include commercial wetting agents and surface-active agents, for example, the tenside marketed under the name Lumiten IRA by the firm BASF.

The above-described solutions or dispersions of the adhesive for formation of the adhesive layer can be applied in amounts of 10 to 30 g/m$^2$, preferably 15 to 25 g/m$^2$ to the cover layer, these values being given in terms of the dry substance.

For formation of the cover layer, preferably thermoplastic or thermoelastic polymers in solution or in a dispersion, especially an aqueous dispersion, are used. There are few limitations as to the film-forming polymers that can be employed. The usual binders are not tacky. In the sense of the invention, the following substances may be employed for the cover layer:

a) polyurethane of a molecular weight of 15,000 to 50,000, for example Permuthane U 4924, marketed by the firm Stahl-Chemie, or Desmolac 2100 marketed by the firm Bayer AG, b) linear saturated polyesters of a molecular weight of 20,000 to 30,000, for example Vitel PE 307 marketed by Goodyear Tire and Rubber, c) styrene-isoprene-styrene copolymers as, for example, Cariflex TR 1107 marketed by the firm Shell-Chemie, d) acrylates and methacrylates, for example Pexigum 7 H marketed by the firm Roehm GmbH, e) polyamides, diphenyl acid modified, for example Scope 30 marketed by the firm Rhone-Poulenc or Emerez 1533 marketed by the firm Emery Chemicals, f) polymer dispersions on a vinyl-propionate base, for example, Propiofan 6D marketed by the firm BASF, g) carboxymethyl group containing, water-soluble polymethylacrylates, for example Rohagit SD15 as marketed by the firm Roehm GmbH, h) wax-like polyolefin dispersions, especially aqueous polyethylene dispersions, such as that marketed under the name Epotal 181D by the firm BASF, i) an aqueous dispersion of acrylic acid ester-styrene copolymer, marketed under the name Acronal 290D by the firm BASF, and j) an aqueous copolymer dispersion of acrylic acid and methacrylic acid esters, marketed under the name Acronal 627 by the firm BASF.

The above listing of materials for the formation of the cover layer have been found to be especially effective, but the list should not be limited thereto. The ordinary skilled worker in the art will readily be able to select other binders which are transparent when used in the cover layer and cover the adhesive layer so that the tacky surface of the latter will not be exposed.

The cover layer preferably contains a small portion of a pressure-activated tacky adhesive, for example 5 to 20% by weight and preferably 10 to 15% by weight of the adhesive.

The substance of the invention, which has not been described in the literature to the best of our knowledge, is to incorporate into the relatively thick adhesive layer, the coloring agent, the cover layer then being substantially thinner and serving only to cover this adhesive layer. The coloring agent can be a dyestuff. The marking efficiency has been fond to be especially good when instead of or in addition to the dyestuff, a pigment, especially a fluorescent pigment is included in the adhesive layer. To ensure the desired transparency of the marking strip which is applied to the substrate, this pigment is preferably provided in especially finely-divided form, usually in a particle size of less than about 2 micrometers, especially less than 1 micrometer.

As fluorescent pigments, the doughy pigment compositions marketed under the name Sinloihi by the firm Worlee-Chemie GmbH, are preferred. Here the finely-divided pigments are embedded in a synthetic resin. They do not exceed in particle size the above-mentioned upper limits. The Sinloihi commercial products are available in various colors and one may use those designated by Sinloihi as SW-12 green, SW-27 rose, SW-14 orange and SW-15 yellow.

It has also been fond to be advantageous when a coloring agent preparation is also included in the cover layer, especially in the form of fluorescent pigments. In this case the above upper particle-size limits should also be observed. In that case, the starting material for the cover layer, especially in the form of an aqueous dispersion of the binder, can include some 2 to 35% by weight of the coloring agent, preferably 10 to 20% by weight of the coloring agent, referred to the dry substance content of the dispersion.

The main marking function is thus fulfilled by the colored, especially pigmented, adhesive layer. The optimal coloring agent, especially pigment content depends upon various factors. For example, it depends upon the type of adhesive selected, the pigments themselves and upon any other additives which may be included. A critical value or critical range cannot, therefore, be given for the coloring agent in the adhesive layer. The coloring agent can be present in an amount of 5 to 35% by weight, especially 10 to 20% by weight, referred to the dry substance and preferably in the form of a pigment as noted.

The above-described materials for the various layers satisfy the basic requirements for the adhesive bonding strengths of the various layers as defined via the adhesion work corresponding to the Dupre equation (K. L. Wolf "Physik und Chemie der Grenzflächen, Springer Verlag 1957, S. 164), such that the adhesive bond between the adhesive layer and the cover layer is greater than that between the cover layer and the carrier. If this is not the case as a result of the compositions used, then an appropriate oxide adhesive layer must be applied to the carrier to satisfy this requirement. Of course the composition should satisfy the further requirement that the cover layer itself will not be tacky or adhesive to materials which may come into contact therewith once the carrier has been stripped away. Such materials, of course, include paper.

These conditions can be defied in terms of the symbol S which can represent the adhesion ratio between the different materials. For example $S_1$ can represent the paper/adhesive layer, adhesive strength $S_2$, the adhesive strength between the cover layer and the adhesive layer, $S_3$ the adhesive strength between the cover layer and the carrier, $S_4$ the adhesive strength between the cover layer and paper and $S_5$ the adhesion ratio adhesive layer/carrier. The prescribed conditions require $S_1$, $S_3$ and $S_5$ to be much smaller than $S_2$. Furthermore, if the free surface of the coloring strip applied to the substrate, especially paper, is not to stick to anything else, $S_4$ should be close to zero or to approach zero. In other words, the cover layer should not stick to either the hand of the user or to another sheet of paper placed on top of the marked substrate.

In use of the marking tape of the invention, the tape can be put up in a roll and applied to the substrate by a hand-held device of the type described in the aforementioned patents whereby upon rolling of the tape against the substrate, the adhesive layer will cause the adhesive layer and the cover layer to adhere to the substrate while the carrier is stripped off. Such a hand-held device can be referred to as a hand roller and can have a foot pressing the tape against the substrate and projecting form the housing. A supply spool of the tape may be received in the housing and a take-up spool can retrieve the stripped carrier.

By means of an appropriate drive between the two spools in the housing, the tape may be maintained under a constant temperature as it passes over the foot.

The user holds the device in his hand and presses the applicator foot at which the adhesive layer is exposed against the paper. By drawing the device along the text portion to be highlighted, the fluorescent adhesive layer and the cover layer, associated therewith are applied to the line of text. A slight tug on the device can cause separation in the strip deposited on the paper without the need for cutting.

The marking tape of the invention has numerous advantages.

It is suitable, for example, for the marking of important words, lines and paragraphs in books or the like with a transparent fluorescent layer. The removal of the marking strip is possible utilizing a rubber eraser and in many cases by simple hand-rubbing, thereby restoring the text to its original state. Text portions, drawings or characters can be highlighted in any text.

If desired, the pigment proportion in the adhesive layer and/or in the cover layer can be made especially high to eliminate transparency. In this case, the strip can be used as a cover marker for correction of errors in typewritten or printed texts. The cover layer can be overwritten by appropriate typewriting devices or manually.

Furthermore, with a transparent marking strip, written characters which are sensitive to the environment, for example, ambient air, can be protected and shielded from the air by the marking tape of the invention.

BRIEF DESCRIPTION OF THE DRAWING

The above and other objects, features and advantages of the present invention will become more readily apparent from the following description, reference being made to the accompanying drawing, the sole FIGURE of which is a diagrammatic cross sectional view illustrating the principles of the invention.

SPECIFIC DESCRIPTION

In the drawing, the substrate 10 has a printed surface 11 which is to be highlighted or marked. This is achieved by using a marking tape generally indicated at 12 and comprising a strippable support or carrier 13 and to which a cover layer 14 is applied. A pigmented adhesive layer 15 is applied to the relatively thin cover layer and is, as shown, substantially thicker. In applying the marking strip 16 to the substrate, this marking strip consisting only of the adhesive layer 15 and the cover layer 14, a roll of the tape is provided in a hand-held applicator 17, not shown in detail, which has a foot pressing the tape against the substrate as the applicator is drawn in the direction of the arrow 18.

The adhesive layer bonds to the substrate while the strippable support tape is drawn off in the direction of arrow 19. The surface 20 of the cover layer is nontacky and prevents contact of the fingers or hand of the user or other sheets of paper with a pressure activated adhesive layer 15 of the marking strip. The layers 14 and 15 can be transparent when the marking strip is used in a highlighting application.

SPECIFIC EXAMPLE

Example 1

A dispersion for producing the cover layer is formed with the following composition:

| | |
|---|---|
| Polyethylene dispersion (39% aqueous) (Epotal 181 D) | 68 parts by weight |
| Sodium salt of a sulfosuccinic acid ester (65% aqueous)(Lumiten IRA) | 2 parts by weight |
| Carboxylated acrylic acid copolymer (52% aqueous)(Vantac XX 36/11) | 10 parts by weight |
| Fluorescent pigment dough (40% aqueous) (Sinloihi SW-15 yellow) | 10 parts by weight |
| | 100 parts by weight |

This composition is applied by a doctor blade in an amount of 11 g/m² (referred to the dry substance) on a silicone-coated paper carrier. The water component was evaporated at about 100° C. by contacting hot air over the coating.

After drying, also utilizing the doctor blade, an aqueous dispersion of the following composition was applied to form the adhesive layer on the surface of the cover layer:

| | |
|---|---|
| Carboxylated acrylic acid copolymer (52% aqueous)(Vantac XX 36/11) | 89 parts by weight |
| Sodium salt of a sulfosuccinic acid ester (65% aqueous )(Lumiten IRA) | 1 part by weight |
| Fluorescent pigment dough (40% aqueous) (Sinloihi SW-15 yellow) | 10 parts by weight |
| | 100 parts by weight |

The adhesive composition was doctored onto the cover layer in an amount of 45 g/m² related to the dry substance content. The water was evaporated at about 100° C. by conducting hot air over the coating.

The resulting marking tape was used for the marking of text locations, characters and drawings on paper substrates utilizing a commercially available hand roller.

Example 2

Example 1 was followed except that the dispersions used had the following compositions:

| | |
|---|---|
| Cover Layer: | |
| Acrylic-Methacrylic copolymer (50% aqueous)(Acronal 627) | 71 parts by weight |
| Sodium salt of a sulfosuccinic acid ester (65% aqueous)(Lumiten IRA) | 1 part by weight |
| Acrylic acid copolymer (62% aqueous) (Ucecryl 913) | 8 parts by weight |
| Fluorescent pigment dough (40% aqueous) (Sinloihi SW-12 green) | 20 parts by weight |
| | 100 parts by weight |
| Adhesive Layer: | |
| Acrylic acid copolymer (62% aqueous) (Ucecryl 913) | 80 parts by weight |
| Sodium salt of a sulfosuccinic acid ester (65% aqueous)(Lumiten IRA) | 2 parts by weight |
| Fluorescent pigment dough (40% aqueous) (Sinloihi SW-12 green) | 18 parts by weight |
| | 100 parts by weight |

Example 3

Example 1 was followed except that the following compositions were used for producing the cover layer and the adhesive layer:

| | |
|---|---|
| Cover Layer: | |
| Styrene-Acrylic acid ester copolymer (50% aqueous)(Acronal 290D) | 75 parts by weight |
| Sodium salt of sulfosuccinic acid ester (65% aqueous)(Lumiten IRA) | 1 part by weight |
| Acrylic acid copolymer (60% aqueous) (Ucecryl PC 80) | 4 parts by weight |
| Fluorescent pigment dough (40% aqueous) (Sinloihi SW-27 rose) | 20 parts by weight |
| | 100 parts by weight |
| Adhesive Layer: | |
| Acrylonitrile modified copolymer (60% aqueous)(Jagotex KEM 2318) | 79 parts by weight |
| Sodium salt of sulfosuccinic acid ester (65% aqueous)(Lumiten IRA) | 1 part by weight |
| Fluorescent pigment dough (40% aqueous) (Sinloihi SW-27 rose) | 20 parts by weight |
| | 100 parts by weight |

Example 4

Example 1 was followed with the exception that no fluorescent pigment was incorporated into the cover layer. The resulting product also was capable of being used as a marking tape in the same manner as the tape of Example 1.

I claim:

1. A multilayer flexible marking band for applying a colored marking to a substrate, comprising:
   a strippable carrier;
   a transparent binder-containing cover layer adherent to said strippable carrier but from which said carrier can be stripped upon application of said band to said substrate; and
   a transparent adhesive layer with a thickness of about 15 to 30 micrometers containing a coloring agent visible through said cover layer, bonded to said cover layer, and adapted to adhere to said substrate, said cover layer having a stronger adhesion to said adhesive layer than to said carrier, and said adhesive and cover layers having respective thicknesses in a ratio of about 8:1 to 2:1.

2. The multilayer flexible band defined in claim 1 wherein said coloring agent is a pigment having a particle size of less than about 2 micrometers.

3. The multilayer flexible band defined in claim 2 wherein said pigment is a fluorescent pigment.

4. The multilayer flexible band defined in claim 1 wherein said carrier is a plastic foil or a silicone-coated paper.

5. The multilayer flexible band defined in claim 1 wherein said cover layer contains as said binder a material selected from the group consisting of a polyolefin, an acrylic-acid ester/styrene copolymer and a copolymer of acrylic acid ester and methacrylic acid ester.

6. The multilayer flexible band defined in claim 1 wherein said cover layer contains as said binder a polyethylene.

7. The multilayer flexible band defined in claim 1 wherein said cover layer contains 2 to 35% by weight adhesive.

8. The multilayer flexible band defined in claim 1 wherein said ratio is about 5:1 to 2:1.

9. The multilayer flexible band defined in claim 1 wherein said ratio is about 3:1.

10. The multilayer flexible band defined in claim 1 wherein said adhesive layer has a thickness of about 15 to 25 micrometers.

11. The multilayer flexible band defined in claim 1 wherein said cover layer has a thickness of about 3 to 10 micrometers.

12. The multilayer flexible band defined in claim 11 wherein said cover layer has a thickness of about 5 to 7 micrometers.

13. The multilayer flexible band defined in claim 1 wherein said adhesive layer contains 5 to 45% by weight of a fluorescent pigment.

14. The multilayer flexible band defined in claim 13 wherein said adhesive layer contains 10 to 30% by weight of a fluorescent pigment.

15. The multilayer flexible band defined in claim 1 wherein said cover layer includes a coloring agent.

16. The multilayer flexible band defined in claim 15 wherein said coloring agent included in said cover layer is a fluorescent pigment having a particle size of less than about 2 micrometers.

17. A multilayer flexible marking band for applying a colored marking to a substrate, comprising:
a strippable carrier;
a binder-containing cover layer adherent to said strippable carrier but from which said carrier can be stripped upon application of said band to said substrate; and p1 an adhesive layer containing a coloring agent visible through said cover layer, bonded to said cover layer, and adapted to adhere to said substrate, said cover layer having a stronger adhesion to said adhesive layer than to said carrier, said adhesive and cover layers having respective thicknesses in a ratio of about 8:1 to 2:1, said coloring agent being a fluorescent pigment which has a particle size of less than 1 micrometer, and said cover and adhesive layers being sufficiently transparent that any text on said substrate covered by said multilayer flexible band remains visible therethrough.

* * * * *